(12) United States Patent
Piesinger

(10) Patent No.: US 8,723,719 B1
(45) Date of Patent: May 13, 2014

(54) THREE DIMENSIONAL RADAR METHOD AND APPARATUS

(71) Applicant: Gregory Hubert Piesinger, Cave Creek, AZ (US)

(72) Inventor: Gregory Hubert Piesinger, Cave Creek, AZ (US)

( * ) Notice: Subject to any disclaimer, the term of this patent is extended or adjusted under 35 U.S.C. 154(b) by 0 days.

(21) Appl. No.: 13/889,505

(22) Filed: May 8, 2013

Related U.S. Application Data

(62) Division of application No. 12/661,595, filed on Mar. 18, 2010, now Pat. No. 8,456,349.

(51) Int. Cl.
*G01S 13/93* (2006.01)
*G01S 13/00* (2006.01)
*G01S 13/46* (2006.01)
*G01S 13/88* (2006.01)
*H01Q 21/06* (2006.01)
*H01Q 3/04* (2006.01)
*H01Q 13/22* (2006.01)
*G01S 13/91* (2006.01)

(52) U.S. Cl.
CPC ............... *G01S 13/003* (2013.01); *G01S 13/46* (2013.01); *G01S 13/88* (2013.01); *H01Q 21/061* (2013.01); *H01Q 3/04* (2013.01); *H01Q 13/22* (2013.01); *G01S 2013/468* (2013.01); *G01S 13/93* (2013.01); *G01S 13/91* (2013.01)
USPC .................. 342/29; 342/36; 342/59; 342/146

(58) Field of Classification Search
None
See application file for complete search history.

(56) References Cited

U.S. PATENT DOCUMENTS

| | | | | |
|---|---|---|---|---|
| 5,252,980 | A * | 10/1993 | Gray et al. | 342/59 |
| 5,448,243 | A * | 9/1995 | Bethke et al. | 342/59 |
| 5,534,868 | A * | 7/1996 | Gjessing et al. | 342/26 D |
| 6,407,670 | B1 * | 6/2002 | Dysarsz et al. | 340/573.2 |
| 7,205,930 | B2 * | 4/2007 | Ho et al. | 342/126 |
| 7,375,675 | B2 * | 5/2008 | Barnum | 342/90 |
| 7,414,570 | B2 * | 8/2008 | Budic | 342/90 |
| 7,479,884 | B1 * | 1/2009 | Fullerton | 340/572.7 |
| 8,077,074 | B2 * | 12/2011 | Venkatachalam et al. | 342/59 |
| 8,395,484 | B2 * | 3/2013 | Fullerton | 340/10.4 |
| 2008/0266171 | A1 * | 10/2008 | Weber et al. | 342/123 |

* cited by examiner

*Primary Examiner* — Matthew M Barker

(57) ABSTRACT

A bistatic radar receiver is centrally located within an array of multiple bistatic transmitters at an airport to precisely determine bird positions and altitudes. Bird target reflections from multiple transmitters are received by the radar receiver. Target location is determined by the transmitter location, receiver location, and measured transmitter-to-target-to-receiver ranges. Target position and altitude accuracy is similar to GPS. The radar receiver antenna is composed of a vertical array of elements and rotated 360 degrees in azimuth. The output of each element is downconverted, digitized, and digitally beamformed to provide multiple simultaneous antenna beams each electronically scanned in elevation. When bistatic transmitters cannot be deployed, a narrow-azimuth wide-elevation transmit antenna beam is overlapped with a wide-azimuth narrow-elevation receive antenna beam electronically scanned in elevation to provide a composite narrow azimuth and elevation beamwidth.

7 Claims, 9 Drawing Sheets

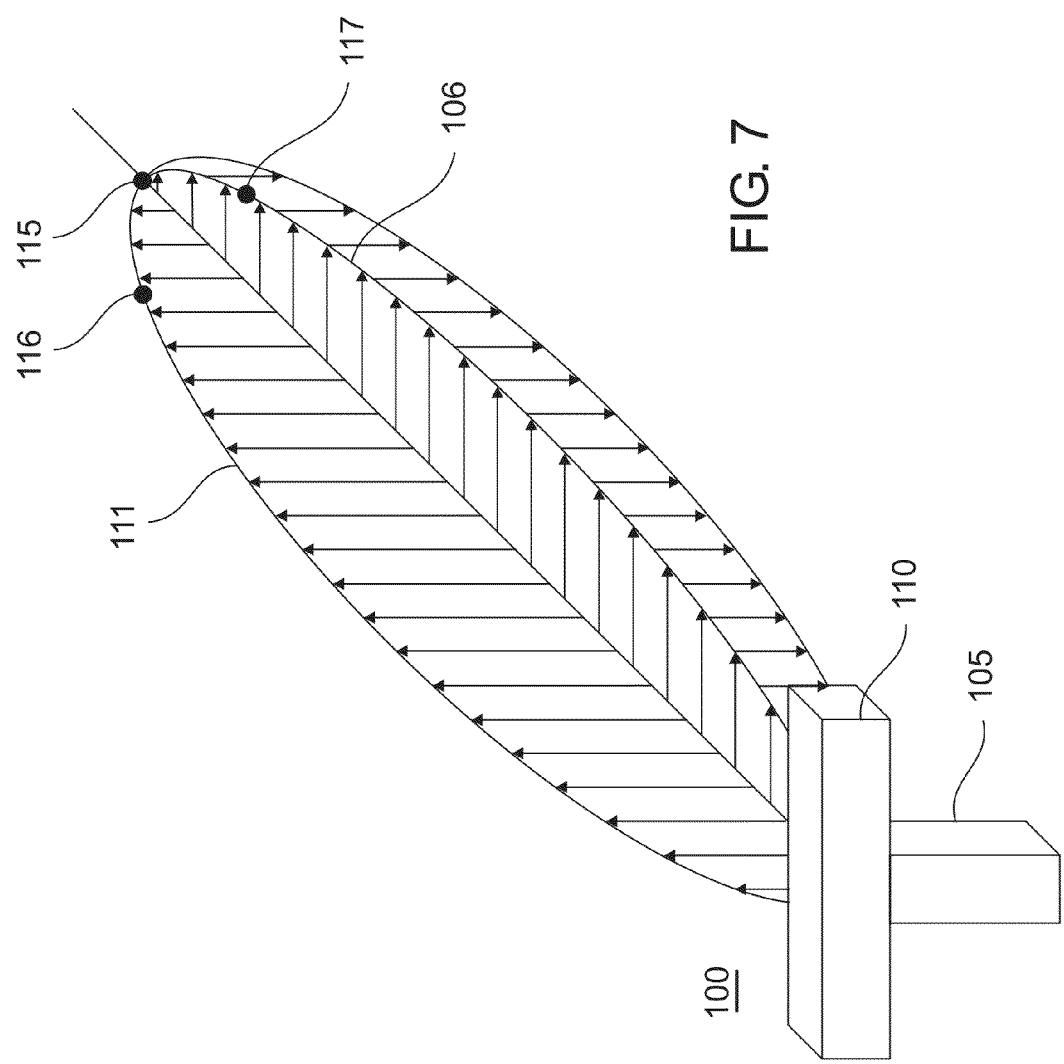

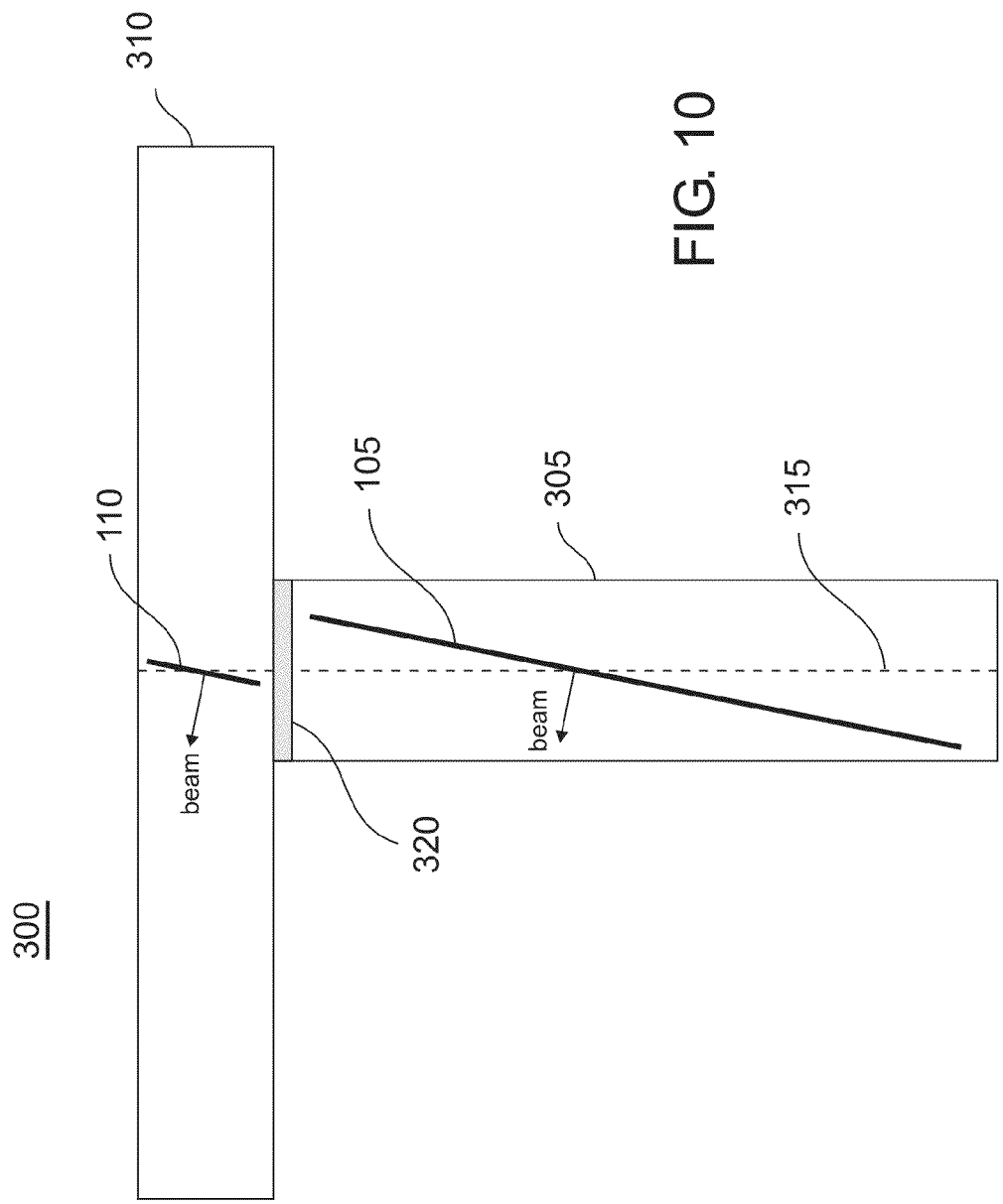

THREE DIMENSIONAL RADAR METHOD AND APPARATUS

RELATED INVENTION

This patent application is a divisional patent application of "Three Dimensional Radar Method and Apparatus" U.S. patent application Ser. No. 12/661,595, filed 18 Mar. 2010.

The present invention claims priority under 35 U.S.C. §119 (e) to: "3D Radar Method and Apparatus" Provisional U.S. Patent Application Ser. No. 61/210,487, filed 19 Mar. 2009, and to: "Aircraft Bird Strike Avoidance Method and Apparatus using Transponder or Pseudolites" Provisional U.S. Patent Application Ser. No. 61/211,409, filed 30 Mar. 2009 which are incorporated by reference herein.

TECHNICAL FIELD OF THE INVENTION

The present invention relates to the field of three dimensional (3D) radar. More specifically, the present invention relates to the field of 3D avian radar for detecting, determining height, and tracking birds.

BACKGROUND OF THE INVENTION

Aviation experts say bird-plane collisions happen daily. Nearly 200 people have been killed or injured since 1990 in accidents involving aircraft and wildlife. It is estimated that bird strikes cost military and commercial aviation over $2 billion each year due to damage and other costs. Most birds fly below 5,000 ft. However, bird strikes have occurred at 17,000 ft. and a few sightings have been made above 20,000 ft. In general, birds fly higher at night and during the spring and fall migration periods. They also fly higher in the presence of complete cloud cover.

Airports take a variety of measures to reduce bird populations near major airports. In a few cases, avian radars are used to detect flying birds near aircraft approach and departure paths. However, outside of these few major airports, no bird detection devices are currently available other than the pilot's see-and-avoid procedures.

Currently, most avian radars consist of modified marine radars using a long narrow horizontal antenna that is rotated in the horizontal plane to provide 360 degree azimuth coverage. These antennas provide narrow azimuth beamwidths and wide elevation beamwidths. Almost no target height information is provided due to the wide elevation beamwidths.

To obtain target height information, a second radar is sometimes added that uses a long narrow vertical antenna that is rotated in the vertical plane. Attempts are than made to correlate data from the vertical antenna radar with the two-dimensional (2D) data from the horizontal antenna radar to provide target height information.

Parabolic reflector antennas provide a narrow pencil beam in both azimuth and elevation in exchange for smaller volume coverage per 360 degree azimuth scan. The antenna elevation is slowly varied as the antenna rotates 360 in azimuth. Many azimuth rotations must be made to obtain a full elevation scan which takes considerable time. This results in a slow coverage volume update rate and poor bird tracking performance.

Military 3D phased array radars are available that can form multiple electronically pointed pencil beams that can provide rapid volume coverage update rates and excellent tracking. However, these radars are far too expensive for use as avian radars.

Current airport avian radars are used primarily for wildlife management and general alert purposes. That is, the radars help wildlife managers track bird movements and provide non-specific alerts to air traffic controllers when birds are in the vicinity of runways. However, without real-time precise positional and altitude information, current avian radars cannot be used to issue specific bird strike collision warnings or to alter air operations based on imminent bird collision threats.

Accordingly, it is the object of the present invention to disclose methods and apparatus which provide a new and improved low cost airport 3D avian radar that will provide precise real-time avian position and altitude information.

SUMMARY OF THE INVENTION

Briefly, to achieve the desired object of the present invention, a bistatic radar receiver is centrally located on the airport and multiple bistatic transmitters are sited around the airport. An avian target is illuminated by multiple bistatic transmit signals and the reflected signals are received by the bistatic radar receiver. The location of the avian target is determined from the known locations of the transmitters, receiver, and measured transmitter signal ranges. Target position accuracy is primarily set by radar range resolution and is not reduced by antenna beamwidth or target range. Target position accuracy determination is similar to that obtained with the Global Positioning System (GPS).

The bistatic radar receiver antenna is composed of a vertical array of elements. The signal from each element is received, digitized, and combined in a FPGA to form a narrow elevation beamwidth that can be electronically scanned in elevation. Multiple such beams can be formed simultaneously. Coherent processing can be provided on some or all formed beams to obtain Doppler target information.

For terrain situations where bistatic transmitters cannot be sited in a particular direction, such as at airports which border a large body of water, a long narrow horizontally orientated non-scanning transmit antenna is combined with the bistatic radar receiver antenna to provide target area coverage over the water. Antenna pattern deconvolution is used to sharpen the antenna beamwidth.

In the preferred implementation, low power CW Pseudo Random Noise (PN) coded bistatic transmitters are used to provide either non-coherent or coherent target processing. Targets are tracked as they move through the coverage area. Target identification is determined based on target reflectivity, altitude, velocity, spectral width, and track patterns.

Other objects and advantages of the present invention will become obvious as the preferred embodiments are described and discussed below.

BRIEF DESCRIPTION OF THE DRAWINGS

FIG. 7 illustrates the overlapping beams of a combined monostatic radar antenna.

FIG. 10 illustrates radomes for the bistatic receiver antenna and for the monostatic transmitter antenna.

DETAILED DESCRIPTION OF THE PREFERRED EMBODIMENTS

The goal of the present invention is to provide a low cost avian radar with very advanced features. The radar's primary feature is precise target height determination because aircraft danger from birds primarily depends on bird altitude. Birds far below or above an aircraft pose no danger to the aircraft even if both the bird and aircraft occupy the same 2D range/azimuth position on a radar display. The height resolution of most current avian radars is on the order of 1000 feet at ranges greater than about 1 km. Therefore, there is currently no way to determine if birds and aircraft displayed on a collision course are actually a threat when using a 2D display.

Figure 1:
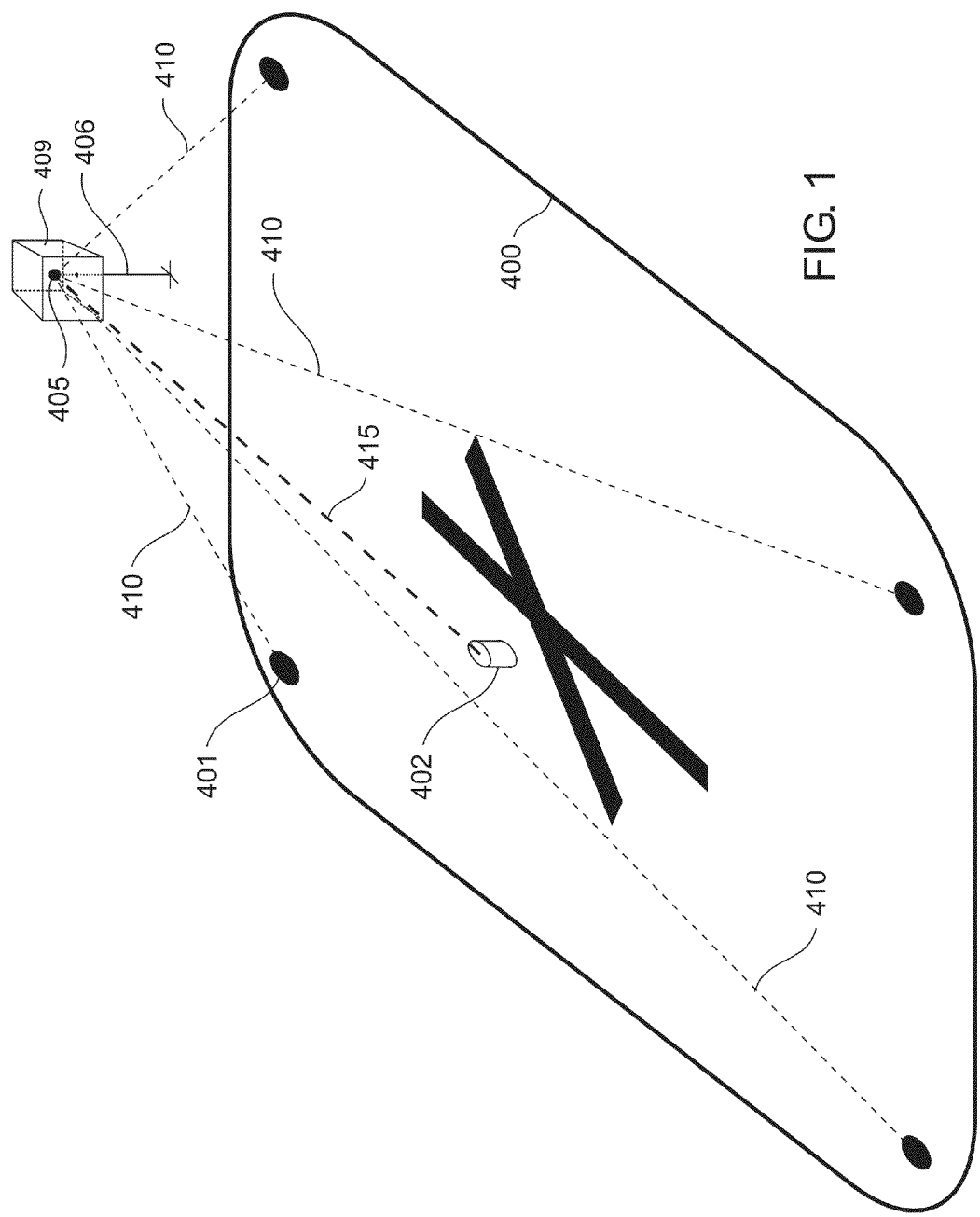
FIG. 1 illustrates an airport avian radar receiver receiving radar target reflections from 4 bistatic transmitters.

FIG. 1 illustrates 4 bistatic transmitters 401 deployed around airport perimeter 400. Bistatic receiver 402 is positioned near the airport center. Avian target 405 is somewhere within the design range of the bistatic transmitter array. Bistatic transmitter signals 410 illuminate target 405 at height 406 and their reflected signals 415 are received by bistatic receiver 402. The location of target 405 is determined from the known locations of bistatic transmitters 401, bistatic receiver 402, and measured bistatic transmitter signal ranges. The measured bistatic transmitter signal range is the sum of bistatic transmitter signal 410 path length plus reflected signal 415 path length.

The locus of all points, such that the total length from a particular bistatic transmitter 401 to the point and then to bistatic receiver 402 is a constant equal to the signal range for that bistatic transmitter 401, defines a 3D surface. Likewise additional 3D surfaces are defined for all other bistatic transmitters 401 signal ranges. The common intersection point of all these surfaces defines the position of target 405.

This process is one of triangulation somewhat similar to position location using GPS. GPS positions are based on solving a set of simultaneous equations by trilateration. Trilateration is a method for determining the intersections of three sphere surfaces given the centers and radii of the three spheres. It also is basically a method of determining position by triangulation as is well known by those skilled in the art of GPS navigation. Trilateration works good for a single target but becomes complicated when applied to this bistatic radar when multiple targets are present. The solution described below can handle multiple target situations.

An alternative solution is to construct a lookup table that relates the center of each 3D resolution volume cell 409 with its corresponding measured bistatic transmitter signal ranges. For each 3D resolution volume cell 409 location, a cell list is constructed that contains the signal range value for each bistatic transmitter 401. The signal range value is equal to the total path length from that bistatic transmitter 401 to 3D resolution volume cell 409 location to bistatic receiver 402. Each cell list is associated with 3D resolution volume cell 409 location using a lookup table.

The minimum size of 3D resolution volume cell 409 is based on the radar's range resolution which is defined by the radar waveform range ambiguity function. The actual size of the 3D resolution volume cell 409 is selected by the required position accuracy of the avian radar.

Each 3D resolution volume cell 409 of interest is checked to see if the reflected signal, from a target at that location, for each bistatic transmitter 401 matches the lookup table values for that location. If so, then a target 405 is declared at that location. Target 405 size is inferred from the reflected signal 415 amplitudes and other information.

Bistatic transmitters 401 transmit signal can all be on the same frequency but modulated with different PN codes similar to GPS signals. For each 3D resolution volume cell 409 examined, a PN code cross correlation with the reflected target signals is performed for each bistatic transmitter 401 signal using the lookup table cell list signal range values for those bistatic transmitters. That is, the signal range value defines the cross correlation range delay value to use for each bistatic transmitter. If no cross correlation responses are obtained, or if the cross correlation response falls below a predetermined target detection threshold, that 3D resolution volume cell is declared target free. If a cross correlation response is obtained for all or a sufficient number of bistatic transmitters 401, a target and its amplitude are declared for that 3D resolution volume cell 409. If a large number of bistatic transmitters 401 are implemented, a sufficient number of cross correlation responses may be somewhat less than the maximum possible since some targets may not be in range of all bistatic transmitter 401.

The advantage of checking specific 3D resolution volume cells 409 is that only the cells of interest need to be checked. The cells checked may initially be "skin" cells around a specific volume to be monitored since targets must penetrate the skin to enter the monitored volume. Once a target is detected in the skin, additional cells around the target location are monitored to track the target as it moves through the monitored volume.

Bistatic transmitter 401 transmit frequency, power level, bandwidth, and PN code parameters depend on many design factors as is well known by those skilled in the art. Also, more than 4 bistatic transmitters can be used if desired. An important design factor in this bistatic radar system is the antenna gain and directivity of bistatic receiver 402. High antenna gain reduces the power required by bistatic transmitters 401. High antenna directivity, directed away from ground targets, limits target returns to those from airborne targets.

The timing, frequency, and code sequence zero range time of each bistatic transmitter 401 is locked to GPS time as is the corresponding timing and cross correlation codes of bistatic receiver 402. This is required so that bistatic receiver 402 knows the PN code zero range time of each bistatic transmitter 401.

Locking each bistatic transmitter 401 to GPS time is a major innovation and advantage of this invention because it allows bistatic transmitters 401 to operate autonomously. That is, no communication is required between bistatic receiver 402 and bistatic transmitters 401. Bistatic transmitters 401 can be sited remotely and powered from solar cell charged batteries if desired. This allows bistatic transmitters 401 to be sited accordingly to the best bistatic transmitter array geometry which eliminates infrastructure power wiring to remote parts of the airport.

The antenna pattern of each bistatic transmitter within or close to the airport can be hemispherical to provide omnidirectional coverage. Far away bistatic transmitters can have an antenna pattern that directs its signal towards the airport.

To reduce ground clutter, bistatic transmitters can be designed for low elevation pattern attenuation using techniques developed for GPS receiving antennas. GPS receiving antennas reduce multipath reflections by designing an antenna pattern that has a sharp increase in pattern attenuation at very low elevation angles. One technique used is to place the GPS antenna in the center of a circular ground plane mount containing a series of concentric metal rings around the GPS antenna. The location and vertical height of the metal rings are designed to attenuate the low elevation signals that cause multipath. Attenuating the bistatic transmitter low elevation transmit energy reduces ground clutter illumination which in turn reduces bistatic receiver 402 low elevation clutter reception.

Figures 2, 8:
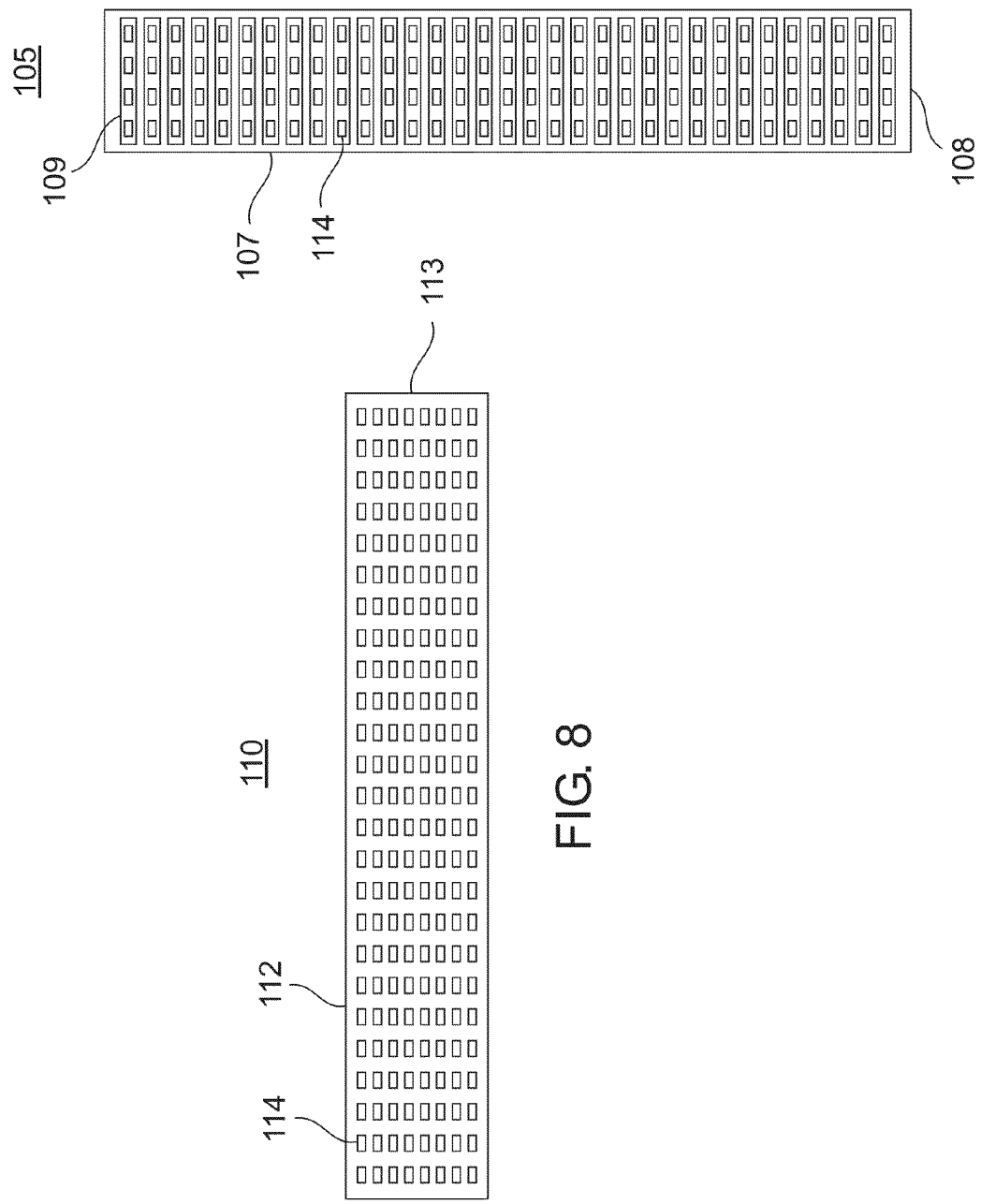
FIG. 2 illustrates an avian radar receiver antenna composed of a vertical array of horizontal slotted array elements.
FIG. 8 illustrates a horizontal slotted array antenna.

A bistatic receiver antenna 105 for bistatic receiver 402 is illustrated in FIG. 2. Except for reflector antennas, such as parabolic dish antennas, most modern high directivity radar antennas consist of an array of low directivity elemental apertures. For example, all modern aircraft weather radar antennas consist of a lightweight "flat plate" array of slotted waveguide apertures. For rectangular array antennas, the azimuth beamwidth is inversely related to its horizontal dimension and its elevation beamwidth is inversely related to its vertical dimension. That is, a wide horizontal array provides a narrow azimuth beamwidth and a tall vertical array provides a narrow elevation beamwidth.

As is well known by those skilled in the art, the total field of an array is equal to the field of a single element positioned at the array origin multiplied by a factor which is widely referred to as the array factor. The array factor is a function of the geometry of the array and its excitation amplitude and phase. By varying the excitation amplitude and phase of each array element, the total field (antenna pattern) of the array can be controlled. The array factor does not depend on the directional characteristics of the radiation elements themselves. Therefore, the array factor can be formulated by replacing the actual elements with isotropic (point) sources. Once the array factor has been derived using the point-source array, the total field of the actual array is obtained by multiplying the field of the actual element at the array origin by the array factor.

Electronic scanning phased array antennas are constructed by controlling the progressive phase difference between array elements. By doing so, the maximum radiation can be squinted in any desired direction to form a scanning array. The scanning antenna pattern is a function of the number of array elements along with their spacing, amplitude, and progressive phase differences.

For bistatic receiver antenna 105, it is desired to have elevation and azimuth beamwidths as narrow as possible to reduce the volume of a radar bin. The volume of a radar bin is determined by the radar's range resolution, antenna elevation beamwidth, and antenna azimuth beamwidth as is well known by those skilled in the art. Reducing its size reduces the number of targets that can simultaneously occupy a single radar bin.

Bistatic receiver antenna 105 is mechanically rotated 360 degrees in azimuth and electronically scanned in elevation. Since electronic azimuth scan is not required, bistatic receiver antenna 105 is composed of a vertical array of fixed scan (not electronically scanned) horizontal array elements 109. Horizontal dimension 108, and vertical dimension 107 of bistatic receiver antenna 105 is also illustrated in FIG. 2. Each horizontal array element 109 is itself an array of apertures 114.

Figure 3:
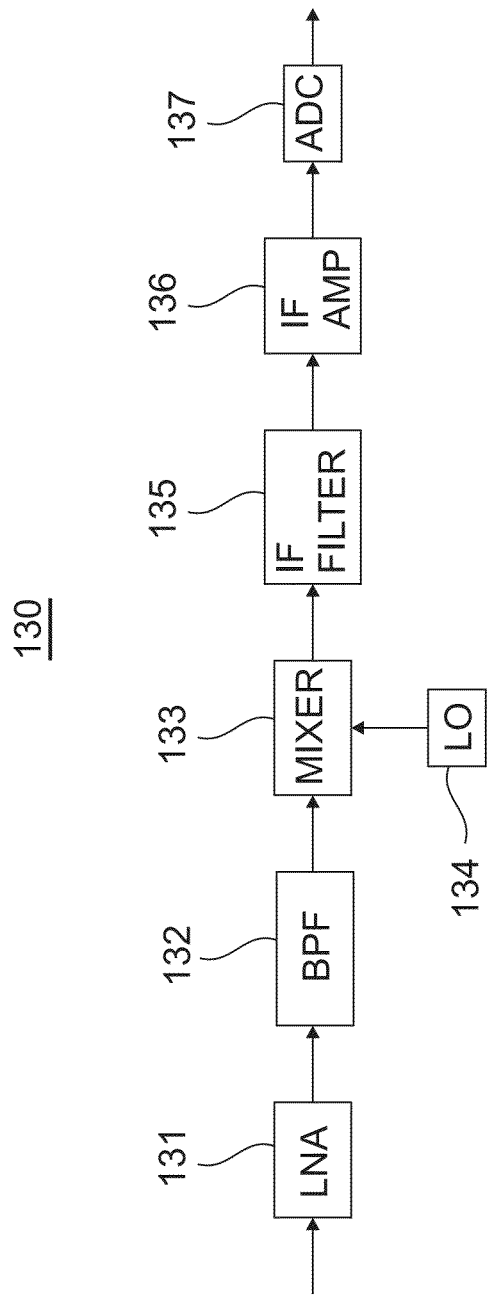
FIG. 3 is a block diagram of a receiver used for each horizontal slotted array element.

The signal produced by each horizontal array element 109 of bistatic receiver antenna 105 is received using identical array element receivers 130 illustrated in FIG. 3. The output of each horizontal array element 109 is amplified by low noise amplifier (LNA) 131, filtered using band pass filter (BPF) 132, downconverted to intermediate frequency (IF) using mixer 133 and local oscillator (LO) 134, image and anti-alias filtered using IF filter 135, amplified and buffered using amplifier 136, and digitized using analog to digital converter (ADC) 137.

Figure 4:
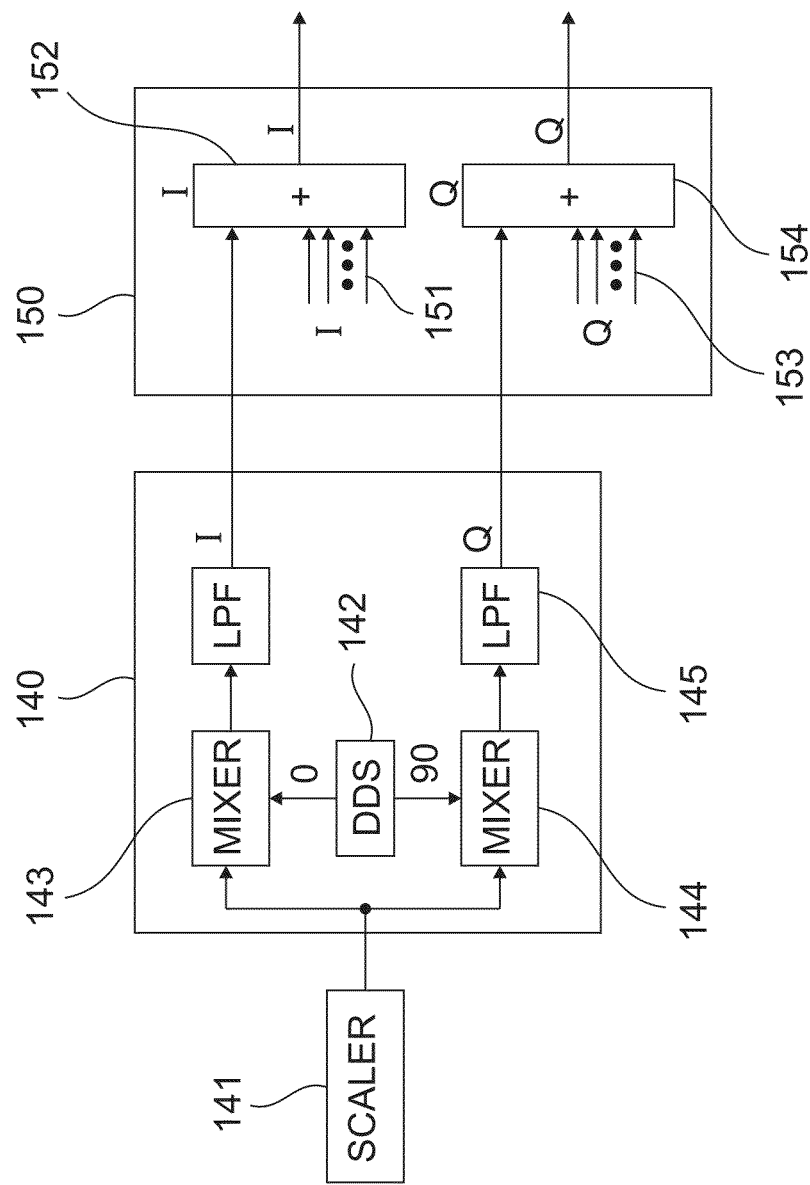
FIG. 4 is a block diagram of a beamformer that combines the outputs of each horizontal slotted array receiver.

Digital beamformer 150 illustrated in FIG. 4 combines the quadrature downconverted received signals from all array element receivers 130 to form the bistatic receiver antenna 105 receive beam. Beamformer 150 sets each array element 109 signal amplitude using digital scaler 141. This scaled signal is then downconverted to baseband and phase shifted using digital quadrature downconverter 140 composed of mixers 143 and 144, direct digital synthesizer (DDS) 142, and low pass filters (LPF) 145. Each in-phase (I) signal 151 from all downconverted array elements 109 are combined in digital summer 152 and all quadrature-phase (Q) signals 153 are combined in digital summer 154.

The elevation pattern of bistatic receiver antenna 105 is completely programmable using scalers 141 and downconverters 140. The elevation beamwidth, sidelobe level, and scan direction are set by the array factor defined by the array amplitude taper of scaler 141 values and the progressive array phase shifts of downconverter 140 phase settings. As is well known by those skilled in the art, beamwidth and sidelobe level are inversely related to each other. The narrowest beamwidths produce the highest sidelobe levels while the lowest sidelobe levels produce the widest beamwidths. When scalers 141 are set for binomial array weighting an antenna pattern is formed with no sidelobes. Such a pattern can be very useful for eliminating ground clutter at low elevation angles.

A major advantage of the subject invention is that the elevation beam pattern is formed digitally using a FPGA or other digital circuit. Since the output of each array element receiver 130 is a digital signal, as many simultaneous beamformers 150 as desired can be implemented. Also, both wide (equal to current avian radar elevation beamwidths) and narrow elevations beamwidths can be formed simply by setting the programmable values of scalers 141 and downconverters 140. Using 30 beamformers 150, stacked elevation beams could be formed for every degree between 1 and 30 degrees of elevation. This would provide a complete high resolution 3D coverage volume scan on a single azimuth revolution. Conversely, a few wide beams for detecting targets and a few narrow beams for tracking individual detected targets could be formed.

Digital beamforming allows very precise antenna patterns to be constructed. To calibrate bistatic receiver antenna 105, it can be first pointed at a distant highly directional low power bistatic transmitter calibration beacon mounted on an existing tall structure. Next, all scalers 141 are set to zero (turned off) except for the array element positioned at the array origin which is set to unity. All downconverters 140 are also initially set for zero phase shift. Using a coherent detector, the amplitude and phase of the reference target received on the array origin element is measured and the values obtained used as reference values for the remaining array elements. Next, scaler 141 and downconverter 140 for each array element are adjusted, while all other array element scalers 141 are turned off, to obtain the same reference amplitude and phase shift values. This procedure ensures that the initial amplitude and phase shift of each array element are identical (defines the starting point for a uniform array factor).

From this starting point, any desired predetermined elevation antenna pattern and scan angle can be accurately programmed into beamformer 150 because the required array factor amplitude weighting can be performed with digital precision. Such precision would be impossible to obtain using mechanical or analog attenuators and phase shifters.

Figure 5:
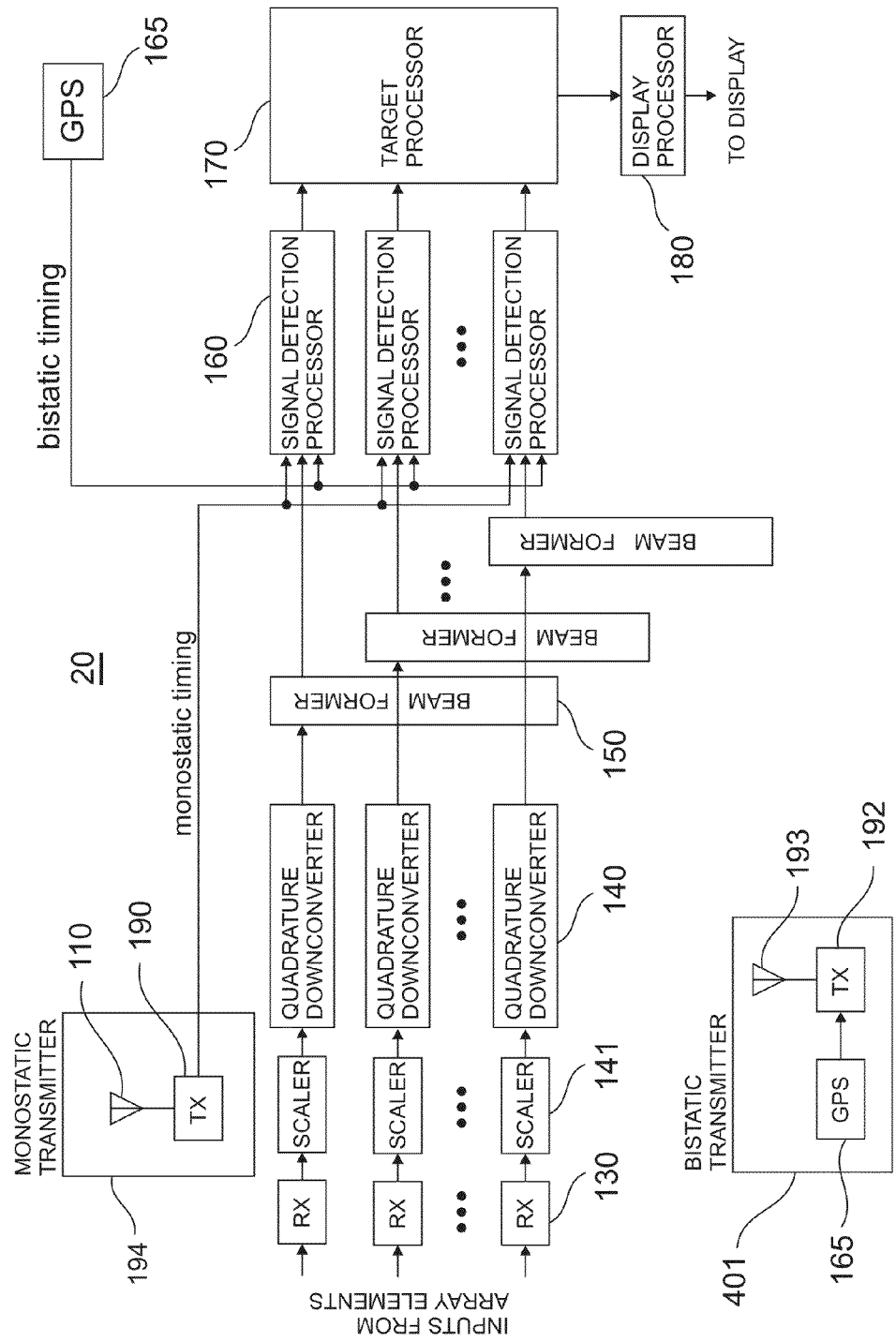
FIG. 5 is an overall block diagram of the avian radar.
Figure 6:
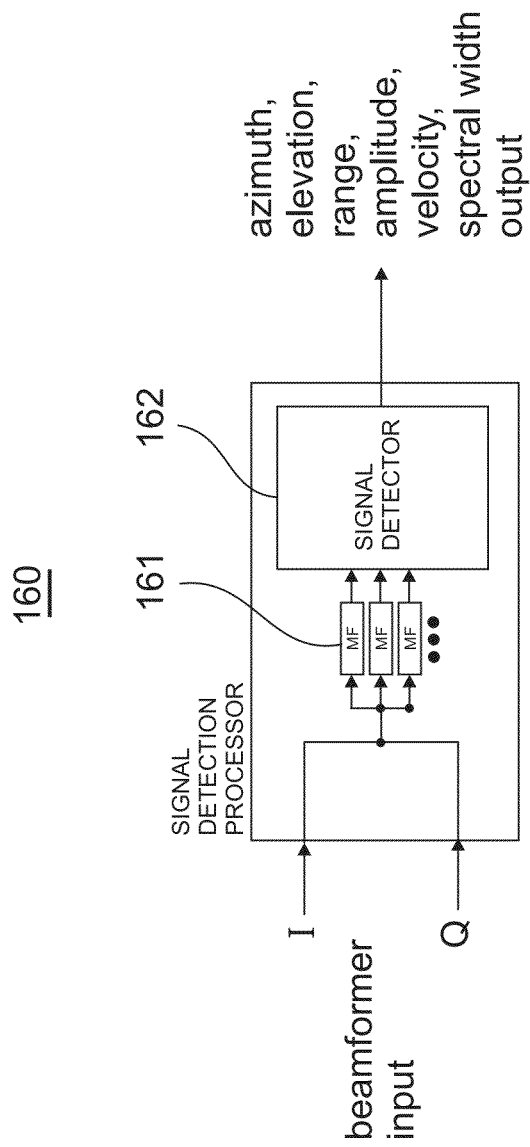
FIG. 6 is a block diagram of the avian radar signal detection processor.

Avian radar 20 of the subject invention is illustrated in FIG. 5. The complex output from beamformers 150 is applied to signal detection processors 160 illustrated in FIG. 6 which consist of a parallel bank of Doppler matched filters 161 and signal detector 162. GPS receiver 165 provides precise timing required for signal detector 162 to determine zero range of each bistatic transmitter 401. Each bistatic transmitter 401 consists of GPS receiver 165, transmitter 192, and antenna 193. Monostatic transmitter 194 (when used) consists of transmitter 190 and monostatic transmit antenna 110.

Received signals from each beamformer 150 are matched filtered and coherently detected. Detected targets are tagged in terms of their azimuth angle, elevation angle, 3D resolution volume cell 409, amplitude, Doppler frequency, and spectral width. Target processor 170 applies tracking and spectral width algorithms to eliminate non-avian targets, identify probable bird type, and form target tracks for display. Display processor 180 formats target data for display on various monitors and provides various operator alerts. Bird locations are communicated to air traffic controllers or aircraft pilots in real-time so that aircraft can be diverted or take evasive action thus preventing a bird strike.

Target positional and altitude accuracy of this bistatic radar is determined by its radar signal range resolution, bistatic transmitter arrangement, and target position with respect to this arrangement. Implementing radar signals similar to those signals used in GPS allows target accuracy's on the same order as obtained by GPS receivers under the same GPS or pseudolite geometry. When visible GPS satellites are close together in the sky, the geometry is said to be weak and the dilution of precision (DOP) value is high so GPS precision is low. When far apart, the geometry is strong, the DOP value is low, and GPS precision is high.

If an airport is adjacent to a large body of water and bistatic transmitters 401 cannot be installed on the water side of the airport, the DOP for targets over water will be high which will reduce the bistatic radar target accuracy. This loss of accuracy can be overcome with the monostatic radar illustrated in FIG. 7.

FIG. 7 illustrates combined antenna 100 composed of long narrow horizontal monostatic transmit antenna 110 combined with bistatic receiver antenna 105. Monostatic transmit antenna 110 forms narrow-azimuth wide-elevation transmit beam 111 and bistatic receiver antenna 105 forms narrow-elevation wide-azimuth receive beam 106. The two antennas are orientated so that the maximum beam patterns of both antennas overlap.

Target 115 is detected because it is simultaneously illuminated by transmit beam 111 and received by receive beam 106. Target 116 is not detected because it is outside receive beam 106 even though it is illuminated by transmit beam 111. Target 117 is not detected because it is not illuminated by transmit beam 111 even though it is within receive beam 106. Therefore, the effective combined antenna 100 beamwidth is narrow in both azimuth and elevation.

For monostatic transmit antenna 110, it is desired to have an azimuth beamwidth as narrow as possible and an elevation beamwidth equal to the desired volume coverage in elevation. For an avian radar, the desired elevation coverage is approximately 30 degrees. FIG. 8 illustrates monostatic transmit antenna 110 composed of an array of apertures 114, horizontal dimension 112, and vertical dimension 113. Monostatic transmit antenna 110 can be a fixed scan (not electronically scanned) antenna since monostatic transmit antenna 110 is mechanically rotated 360 degrees in azimuth along with bistatic receiver antenna 105.

For bistatic receiver antenna 105, it is desired to have an elevation beamwidth as narrow as possible since its elevation beamwidth defines combined antenna 100 elevation beamwidth. The azimuth beamwidth is not as important since combined antenna 100 azimuth beamwidth is equal to monostatic transmit antenna 110 azimuth beamwidth.

Effective antenna beamwidths far less than the actual antenna beamwidth can be formed on sparse point targets using antenna pattern deconvolution. The elevation scan response of a radar is equal to the convolution of the target reflectivity and the elevation antenna pattern. As is well known by those skilled in the art, if x is the target reflectivity signal into the antenna as a function of elevation angle, h is the antenna elevation transfer function, and y is the antenna output response, then y=x*h where "*" indicates convolution. Deconvolution attempts to find a solution for x. That is, deconvolution attempts to find the target reflectivity as a function of elevation angle that produced the antenna output response y. Since the convolution of a function by its inverse is equal to the unit impulse $\delta$, $y*h^{-1}=x*h*h^{-}=x*\delta=x$ because the convolution of an unit impulse with any function is simply the function. Therefore, if the received antenna elevation response is convolved with an inverse of the antenna elevation response, the actual target elevation reflectivity is determined.

For a strong point source target, the target effectively acts as an elevation unit impulse input to the antenna. The antenna elevation output response to this elevation unit impulse input is simply the antenna elevation pattern. If this antenna elevation output response is convolved with the known inverse response of bistatic receiver antenna 105, then an elevation point target is obtained at the true elevation location of the target. That is, the target will appear on the display as a point instead of an elongated line in elevation. In a like manner, two point source targets within the elevation beamwidth are resolved after deconvolution as two point targets.

Deconvolution is always an approximation because the received response is corrupted by noise. Also, for continuous distributed targets (like ground clutter), an initial starting point for the input signal is unknown. That is, the initial input sample to the deconvolution circuit has already been convolved with the antenna elevation response.

The avian radar of the present invention is optimized for the successful application of deconvolution for three reasons. First of all, the antenna elevation response is accurately known from the aforementioned calibration procedure and scalers 141 and downconverters 140 precision digital setability. Secondly, the narrow azimuth and elevation beamwidth of combined antenna 100, along with a normal sparse bird target environment, means that most of the radar coverage volume is devoid of targets. This allows the deconvolution algorithm to be initialized to zero (no radar returns) prior to the occurrence of a bird target. Finally, the high gain of combined antenna 100 will provide a high signal to noise ratio (SNR) on most targets which will ensure high deconvolution accuracy.

Deconvolution has been described to improve antenna elevation resolution because altitude information is most important in an avian radar. However, it can also be applied to azimuth scans to improve azimuth resolution. If not applied, then individual bird targets will appear as thin azimuth arcs on a 3D display instead of dots.

Radar is a very mature field with many choices available for frequency, transmit power, and waveform design. Both pulsed and CW waveforms can be used as is well known by anyone skilled in the art. Radar detection is a function of transmit energy, irrespective of the transmit signal waveform design. However, range resolution and Doppler resolution are determined by the actual waveform design as illustrated in FIG. 9.

Figure 9:
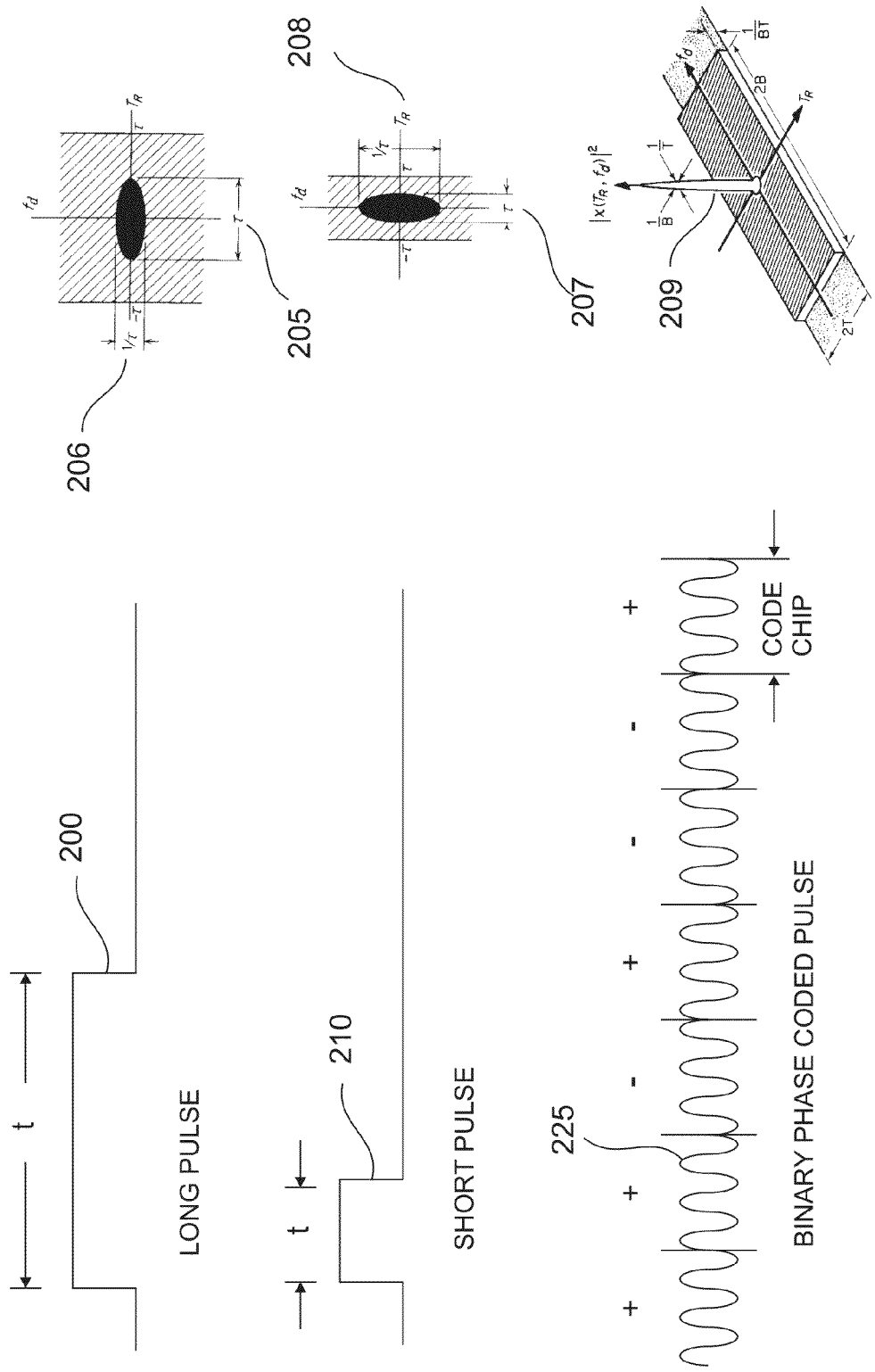
FIG. 9 illustrates the ambiguity diagram of various radar signal waveforms.

FIG. 9 illustrates the ambiguity function of common radar waveforms. Range and Doppler resolution are defined by the radar signal ambiguity function which is simply the cross correlation between the transmit pulse and its range and Doppler shifted versions as is well known by those skilled in the art.

Long pulse 200 is characterized by low range resolution 205 and high Doppler resolution 206. Short pulse 210 is characterized by high range resolution 207 and low Doppler resolution 208. PN coded pulse compression waveform 225 has both high range and Doppler resolution as illustrated by thumbtack response 209.

Although pulse type radar signals can be used, the most appropriate radar signal for both the monostatic and bistatic radars described in this invention is a CW radar signal using PN coded pulse compression waveform 225. A CW monostatic radar does not have the close range reception dead zone caused by transmit pulse blanking required in pulse type radars. Also a monostatic radar pulse compression waveform allows the user to independently set range resolution, Doppler resolution, and processing gain as described in U.S. Pat. No. 7,382,310 "Method for Independently Setting Range Resolution, Doppler Resolution, and Processing Gain of a Pseudo-Random Coded Radar System" which is incorporated herein by reference.

The selection of transmit power, waveform design, and all radar hardware implementation tradeoffs are well known by practicing radar engineers for both monostatic and bistatic radars. The radar cross section for a large variety of birds at different frequencies and aspect angles are available in the literature. The nominal radar cross section of a pigeon is 0.01 square meters.

Although many different transmit frequencies could be chosen for an avian radar, S-band is more appropriate than X-band because the radar cross section of birds is larger and rain penetration is better at S-band frequencies than at X-band frequencies. However, S-band antennas are nearly 3 times larger than X-band antennas.

To protect combined antenna 100 and allow a high rotation speed, it can be housed inside enclosure 300 illustrated in FIG. 10. Vertically orientated bistatic receiver antenna 105 rotates inside tall cylindrical radome 305 while horizontally orientated monostatic transmit antenna 110 (if implemented) rotates inside short cylindrical radome 310. Both antennas are tilted up 15 degrees in elevation and rotate together about rotation axis 315 at the center of both cylindrical radomes. Bistatic receiver antenna 105 electronically scans plus and minus 15 degrees in elevation so as to cover a 30 degree coverage volume in elevation. Shielding material 320 can be used to increase the transmit-receive isolation between the two antennas when monostatic transmit antenna 110 is used.

Since the avian radar of the present invention provides high resolution and 360 degree azimuth coverage, a single bistatic radar receiver sited near the center of the airport should be adequate to monitor the complete airport, approach, and departure paths for all runways. The bistatic radar provides higher performance and is less conspicuous or intrusive than the monostatic radar. Since reflected target signal energy falls off as 6 dB per doubling of range for the bistatic radar instead of 12 dB for the monostatic radar, it should have effective performance far beyond 6 miles.

Detecting pulse compression waveforms is very computationally intensive and processing every coverage volume azimuth-elevation-range radar bin, and every 3D resolution volume cell 409 in that radar bin, on every azimuth rotation is difficult. To vastly reduce the processing requirements, only a thin outer surface of the coverage volume needs to be processed continually. A target can only enter the interior coverage volume by first passing through its outer surface. By continually processing a thin surface skin, all targets entering the coverage volume are detected. Once detected, they can be tracked as they move within the interior coverage volume. Targets in critical areas, for example close to runways and departure paths, can be tracked to within their 3D resolution volume 409.

To further reduce required peak processing power, the digital outputs of all array element receivers 130 can be temporarily stored or buffered during a scan and processed sequentially using the same hardware resources. For example, each quadrature downconverter 140 may be able to sequentially process the output of multiple array element receivers 130 and send the scaled and phase shifted data for each array element to beamformer 150. Likewise, each beamformer 150 may be able to sequentially form multiple beams and send the data to signal detection processor 160 which could also process data from multiple beamformers 150.

This avian radar is very well suited for the use of parallel processing. Through the use of lookup tables that relate 3D resolution volume cells 409 with their corresponding bistatic transmitter signal ranges, multiple processors can be programmed to simultaneously examine different collections of radar bins or 3D resolution volume cells 409. Radar bins containing targets can be passed to other processors that locate all targets in that radar bin to their 3D resolution volume cell 409. Using multiple parallel processors, almost any desired radar resolution and update performance can be obtained simply by adding processing resources.

Avian radars typically need to scan 360 degrees in azimuth. For some special radar applications, narrow azimuth scans on the order of plus and minus 45 degrees may be sufficient. For those applications, an electronic scan antenna could be used in place of monostatic transmit antenna 110. Each array element could be driven by a low power amplifier which in turn was driven by a scaled and phase shifted version of the transmit waveform. The transmit waveform could be generated in a FPGA DDS, upconverted to analog using a digital to analog converter (DAC), filtered, and applied to each array element amplifier. After calibration, this will provide the desired transmit antenna pattern and pointing direction with digital precision similar to that obtained with bistatic receiver antenna 105. This would provide fully scannable pencil beams at a fraction of the cost of a traditional phased array antenna that electronically scans every 2D array element.

Although the preferred embodiments of the invention have been illustrated and described in detail, it will be readily apparent to those skilled in the art that various modifications may be made therein without departing from the spirit of the invention.

For example, two bistatic receiver antennas 105 could be placed back to back and the azimuth rotation speed halved, or four could be arranged in a square and the rotation speed reduced by a factor of 4. This would provide more dwell time on targets but still retain the same volume coverage update rate. Getting more hits on a target during a scan will provide better reflectivity and spectral width estimates. Likewise, the azimuth rotation rate could remain the same and the update rate increased by a factor of 2 or 4 by doubling or quadrupling the number of bistatic receiver antennas 105. For large area coverage, multiple bistatic receiver antennas 105 could be sited at different locations and all could use the same bistatic transmitter array.

If Doppler processing is not required, the I and Q outputs of downconverters 140 can be converted to amplitude only which eliminates quadrature beamformer summer 154.

A key advantage of the present 3D radar invention is its digital programmability, modularity, and scalability. Small airports can implement a smaller bistatic receiver antenna

105. Large airports can implement additional bistatic transmitters 401 to increase range and coverage area. Numerous different antenna patterns can be easily synthesized simply by using different individual array elements, number of array elements, their spacing, their physical layout, and programmable scaler and downconverter values. Parallel processing, for example where each processor implements a beam, can be used to implement a large number of simultaneous beams. Wide beamwidth beams can be implemented for wildlife managers to track broad bird movements and for statistical bird counting purposes. At the same time, narrow beamwidths can be implemented for precise bird pinpointing for real-time aircraft-bird collision avoidance purposes.

Many other simple modifications are also possible without departing from the spirit of the invention.

Although this radar has been described as applied to an airport avian radar application, it can also be used for many applications other than avian radar simply by changing the programmable antenna and waveform parameters. Potential applications include intrusion detection, border security, or various military uses.

What is claimed is:

1. A high resolution bistatic radar for precisely determining avian target locations in a surveillance area, said bistatic radar comprising:
   a plurality of autonomous bistatic transmitters configured to illuminate said surveillance area with radar signals, said bistatic transmitters being transmit only with no communication between said bistatic transmitters either directly or through intermediary equipment;
   a bistatic radar receiver configured to receive reflections of said radar signals from avian targets in said surveillance area, said bistatic radar receiver being receive only with no communication between said bistatic radar receiver and said bistatic transmitters either directly or through intermediary equipment;
   a target processor configured to process said reflections to determine said avian target locations in said surveillance area; and
   a display processor coupled to said target processor and configured to display said avian target locations on one or more display monitors.

2. A high resolution bistatic radar as in claim 1 wherein said bistatic radar receiver additionally comprises:
   a vertical array of antenna elements mechanically rotated in azimuth and electronically scanned in elevation by controlling the progressive phase difference and amplitude between said antenna element signals;
   a receiver coupled to each element of said antenna elements and configured to receive, downconvert, and digitize reflected radar signals from said avian targets illuminated by said bistatic transmitters;
   one or more digital scalers and quadrature downconverters coupled to each said receiver and configured to amplitude scale and downconvert said reflected radar signals;
   one or more digital beamformers coupled to said quadrature downconverters and configured to provide multiple independent antenna beams electronically scanned in elevation; and
   signal detection processors coupled to said digital beamformers, and configured to detect said reflected radar signals.

3. A high resolution bistatic radar as in claim 2 wherein said signal detection processors additionally comprises a plurality of matched filters, said filters matched to different Doppler offset frequencies of said reflected radar signals from said avian targets.

4. A high resolution bistatic radar as in claim 2 wherein said signal detection processors additionally comprises a signal detector configured to measure target parameters of said avian targets, said target parameters include azimuth, elevation, range, amplitude, velocity, and spectral width.

5. A high resolution bistatic radar as in claim 4 wherein said target processor is configured to apply tracking and spectral width algorithms to said target parameters to eliminate non-avian targets, identify probable bird type, and form target tracks for said display processor.

6. A high resolution bistatic radar as in claim 1 wherein said bistatic radar receiver additionally comprises a GPS receiver configured to lock said bistatic radar receiver timing to GPS time and to indicate zero range time of said bistatic transmitters radar signals.

7. A high resolution bistatic radar as in claim 1 wherein said bistatic transmitters additionally comprises a GPS receiver configured to lock said bistatic transmitters transmit frequency and zero range time to GPS time.

\* \* \* \* \*